(12) United States Patent
De Streel

(10) Patent No.: US 12,003,042 B2
(45) Date of Patent: Jun. 4, 2024

(54) STRUCTURE FOR DISTRIBUTING RADIO FREQUENCY SIGNALS

(71) Applicant: PHARROWTECH BV, Leuven (BE)

(72) Inventor: Guerric De Streel, Wavre (BE)

(73) Assignee: PHARROWTECH BV, Leuven (BE)

( * ) Notice: Subject to any disclaimer, the term of this patent is extended or adjusted under 35 U.S.C. 154(b) by 0 days.

(21) Appl. No.: 18/011,666

(22) PCT Filed: Jun. 25, 2021

(86) PCT No.: PCT/EP2021/067490
§ 371 (c)(1),
(2) Date: Dec. 20, 2022

(87) PCT Pub. No.: WO2021/260177
PCT Pub. Date: Dec. 30, 2021

(65) Prior Publication Data
US 2023/0261380 A1     Aug. 17, 2023

(30) Foreign Application Priority Data
Jun. 27, 2020   (EP) ..................................... 20182749

(51) Int. Cl.
*H01Q 5/371*     (2015.01)
*H01Q 1/22*      (2006.01)

(52) U.S. Cl.
CPC ........... *H01Q 5/371* (2015.01); *H01Q 1/2283* (2013.01)

(58) Field of Classification Search
None
See application file for complete search history.

(56) References Cited

U.S. PATENT DOCUMENTS 11,469,507 B2 * 10/2022 Lee ...................... H01Q 9/0407
2005/0219137 A1  10/2005 Heisen et al.
2012/0256796 A1  10/2012 Leiba
(Continued)

FOREIGN PATENT DOCUMENTS

EP        3206256 A1    8/2017
WO     2018119153 A2    6/2018

OTHER PUBLICATIONS

Search Report from European Application No. 20182749.0, dated Dec. 10, 2020.

(Continued)

*Primary Examiner* — Wilson Lee
(74) *Attorney, Agent, or Firm* — Workman Nydegger

(57) ABSTRACT

A structure includes a first face with at least one first aperture and a second face with a plurality of second apertures. The at least one first aperture is connected to the second apertures via through-holes embedded in the structure and having an electrically conducting inner wall and configured to form a waveguide medium for carrying radio frequency, RF, signals between the at least one first aperture and the plurality of second apertures. The at least one first aperture is configured to interface with at least one first external RF circuitry for processing RF signals and the plurality of the second apertures are arranged to interface with a plurality of second external RF circuitries for transmission and/or reception of RF signals. Embodiments may relate to a radio frequency, RF, communication device employing the structure.

18 Claims, 6 Drawing Sheets

(56) References Cited

U.S. PATENT DOCUMENTS

| | | | |
|---|---|---|---|
| 2018/0323501 A1 | 11/2018 | Mentovich et al. | |
| 2019/0305428 A1* | 10/2019 | Hwang | H01Q 9/045 |
| 2019/0378801 A1* | 12/2019 | Leitgeb | H01L 23/552 |
| 2020/0251430 A1* | 8/2020 | Seler | G01S 13/08 |
| 2020/0335873 A1* | 10/2020 | Achour | H01Q 5/371 |
| 2021/0050312 A1* | 2/2021 | Franson | H01Q 1/2283 |
| 2021/0183797 A1* | 6/2021 | Vincent | H01P 11/002 |
| 2022/0209392 A1* | 6/2022 | Wang | H01Q 1/38 |
| 2023/0130741 A1* | 4/2023 | Itami | H01Q 9/045 |
| | | | 343/702 |

OTHER PUBLICATIONS

International Search Report from PCT Application No. PCT/EP2021/067490, dated Oct. 4, 2021.

* cited by examiner

STRUCTURE FOR DISTRIBUTING RADIO FREQUENCY SIGNALS

TECHNICAL FIELD

Various example embodiments relate to a structure for distributing radio frequency, RF, signals and a radio frequency, RF, communication device.

BACKGROUND

Phased antenna arrays allow for controlling the antenna radiation pattern by changing the relative phases and amplitudes of the radio frequency, RF, signals fed to the respective antenna radiating elements. Phased antenna arrays offer low-profile, high-gain and beam steering capabilities which makes them suitable for radio frequency, RF, communication devices.

In such RF communication devices, the phased antenna array is divided into two or more smaller antenna arrays, referred to as sector antenna arrays, where the transceiver and the baseband functionalities are shared across the communication device over a distance of for example few centimetres. This allows avoiding unnecessary duplication of processing functionalities, e.g. transceiver and/or baseband, as well as to improve performance and reduce the overall costs.

SUMMARY

The scope of protection sought for various embodiments of the invention is set out by the independent claims.

The embodiments and features described in this specification that do not fall within the scope of the independent claims, if any, are to be interpreted as examples useful for understanding various embodiments of the invention.

Amongst others, it is an object of embodiments of the invention to provide a structure for distributing radio frequency, RF, signals across an RF communication device in a low-loss and a cost-efficient manner.

This object is achieved, according to a first example aspect of the present disclosure, by a structure, comprising a first face with at least one first aperture and a second face with a plurality of second apertures, the at least one first aperture is connected to the second apertures via through-holes embedded in the structure and having an electrically conducting inner wall and configured to form a waveguide medium for carrying radio frequency, RF, signals between the at least one first aperture and the plurality of second apertures, wherein the at least one first aperture is configured to interface with at least one first external RF circuitry for processing RF signals and the plurality of the second apertures are arranged to interface with a plurality of second external RF circuitries for transmission and/or reception of RF signals, and, wherein the second face is arranged to accommodate the plurality of second external RF circuitries, and is dimensioned according to radiating requirements related to the frequency of the RF signals.

The structure thus provides an integrated waveguide medium for carrying radio frequency, RF, signals between the one or more first apertures and the plurality of second apertures. The integrated waveguide medium enables wide bandwidth and a low-loss distribution of radio frequency, RF, signals across the through-holes and, therefore, the structure.

The structure may be made for example as a solid structure with through-holes drilled into it, or, it may be made of separate parts glued together. The structure may be made of conductive materials, such as aluminium or copper, or, non-conductive materials, such as resin, plastic, or any kind of polycarbonate. In case the structure is made of non-conductive material, the through-holes need to be coated with a conductive material as provided above so that they act as a waveguide medium. The structure allows using simple manufacturing processes, such as 3D printing or 3D moulding techniques. Further, by sizing the structure to accommodate the external RF circuitries, the structure provides mechanical support for the external RF circuitries. As a result, a cost-efficient structure providing structural support for the external RF circuitries is provided.

Further, by sizing the structure to accommodate the external RF circuitries, the structure allows for spacing the second apertures according to the radiating requirements. This allows to appropriately space and distribute the second apertures along the second face thus enabling high-design flexibility and easy integration with the external RF circuitries.

According to example embodiments, the structure or part of it may be made of a thermally conductive material, such as aluminium or copper, so that it may function as a heat sink. The structure thus enables the dissipation of thermal energy from the RF circuitries, thereby preventing overheating of the RF circuities.

According to example embodiments, the first face comprises a plurality of first apertures connected to the second apertures via the through-holes. By providing more than one aperture on the first face, a plurality of RF signals may be carried by the structures. For example, the structure allows for distributing RF signals from one or more active RF circuitries, e.g. one or more FE circuitries, towards a multitude of passive RF circuitries, e.g. antenna arrays. The structure thus enables a highly flexible waveguide medium design complying with the requirements of the RF communication device. Furthermore, the first apertures may be spaced according to the interconnect requirements which further improves the design flexibility of the structure and its integration with the external RF circuitries.

According to example embodiments, the through-holes may have a circular, a square or a rectangular cross-section. The type and dimensions of its cross-section depend on the frequency of the RF signals carried by the waveguide medium, i.e. the through-holes. The through-holes may have a linear or a meandering structure. Further, at least a subset of the through-holes may comprise a branch-like structure. For example, at least a subset of through-holes may connect one first aperture with a subset of the second apertures, thus forming an air-filled channel with a branch-like structure. The air-filled channel thus functions as an RF signal splitter/combiner, i.e. in one direction, it splits the RF signal into a plurality of RF signals and in the other direction, it combines the RF signals. By designing the through-holes to comprise a branch-like structure, an RF signal may be carried from one RF circuitry, e.g. FE circuitry, towards a multitude of other RF circuitries, e.g. two, four or more antenna arrays. Alternatively, at least a subset of the through-holes may connect respective pairs of first and second apertures to form individual air-filled channels, i.e. individual waveguide mediums, between the connected pairs of apertures. By providing different types of through-holes, a highly flexible and easily scalable waveguide medium and, therefore, structure design complying with the requirements of the RF communication device is enabled.

According to example embodiments, at least one through-hole of the through-holes is arranged to connect at least one second aperture from the plurality of the second apertures to at least another second aperture from the plurality of the second apertures to carry RF signals between the plurality of second RF circuitries. Similarly, at least one through-hole of the through-holes is arranged to connect at least one first aperture from the plurality of the first apertures to at least another first aperture from the plurality of the first apertures to carry RF signals between the plurality of RF circuitries located on the first face. By interconnecting one or more first apertures or one or more second apertures, a waveguide medium is formed for carrying RF signals between RF circuitries located on the same face. For example, such a waveguide medium may be used as a communication interface to carry RF signal between different front-end, FE, circuitries, or between a transceiver, TRX, circuitry and one or more FE circuitries. The structure may thus be used to provide cost-efficient, high-bandwidth and low-loss RF signal distribution for a variety of RF communication devices irrespective of their implementations.

According to example embodiments, the structure may comprise different types of quadrilateral cross-sections, such as a square, rectangle, trapezium, honeycomb or others. For example, the structure may comprise a rectangular cross-section, wherein the first face comprises one side of the rectangular cross-section and the second face comprises at least one other side of the rectangular cross-section. Alternatively, the structure may comprise a triangular cross-section, wherein the first face comprises one side of the triangular cross-section and the second face comprises the other sides of the triangular cross-section. The structure is, thus, a multi-facetted structure. Furthermore, the structure may have an aspect ratio close to unity. The aspect ratio is preferably in the range of 0.5 to 1. For example, in the case of a structure with a rectangular cross-section, the sides of the rectangular cross-section are somewhat comparable in size.

Different type of cross-sections allows for designing a structure according to the design requirements and specification of the RF communication systems. For example, a quadrilateral cross-section may be preferred when an optimal thermal dissipation is required, while a triangular cross-section may be preferred when both minimal system size and a large radiating surface are required.

According to example embodiments, the first face is arranged to accommodate at least one first printed circuit board, PCB, configured to interface with the at least one first external RF circuitry and comprising feeding arrangements configured to exchange RF signals with the first apertures. The second face is arranged to accommodate at least one second printed circuit board, PCB, configured to interface with the respective second external RF circuitries and comprising feeding arrangements configured to exchange RF signals with the respective second apertures.

One or more RF circuitries, such as a baseband, BB, circuitry, a transceiver, TRX, circuitry, one or more front-end, FE, circuitries, and antenna arrays, may be provided on a PCB. The PCB thus allows for a cost-efficient and low-loss distribution of low-frequency signals as well as power signals over the PCB.

According to example embodiments, the first apertures are arranged to receive the respective feeding arrangements thereby enabling the waveguide medium to interface with the at least one first external RF circuitry. The second apertures are arranged to receive the respective feeding arrangements thereby enabling the waveguide medium to interface with the plurality of second external RF circuitries.

The feeding arrangements may be easily implemented using conventional PCB manufacturing techniques. The feeding arrangements allow for a simple and insensitive to misalignment interface between the RF circuitries and the waveguide medium. Further, different types of feeding arrangements may be easily implemented. For example, the feeding arrangements provided by the first PCB may be different from the feeding arrangement provided by the second PCB. Examples for feeding arrangements are a capacitive feeding and a monopole probe. This allows designing a structure in accordance with the requirements of the RF communication device.

According to example embodiments, the second face further comprises additional second apertures connected to at least one first aperture of the plurality of first apertures, and, wherein the respective additional second apertures comprise an antenna radiating element.

By providing additional second apertures comprising an antenna radiating element, antenna radiating elements may be easily integrated into the structure. Further, the second apertures may be designed to have different geometries which allow to easily integrate different types of antenna radiating elements into the structure. For example, a horn antenna radiating element may be provided by shaping the second aperture as a funnel. The structure thus provides integration of high-bandwidth, low-loss RF signal distribution together with an antenna network distribution. As a result, a structure with high design flexibility and high integration capabilities is enabled.

According to a second example aspect a radio frequency, RF, communication device is disclosed comprising a structure according to the first aspect, the device comprising at least one first external RF circuitry for processing RF signals, and, a printed circuit board mounted to the first face of the structure comprising at least one first feeding arrangement configured to exchange the RF signals with the structure.

The RF communication device may further comprise a plurality of second external RF circuitries for transmission and/or reception of RF signals, and, a plurality of printed circuit boards mounted to the second face of the structure comprising a plurality of second feeding arrangements configured to exchange the RF signals with the structure.

The first external RF circuitry may comprise an active RF circuitry for processing RF signals, and, the second external RF circuitries may comprise a passive RF circuitry for wireless transmission and reception of RF signals. For example, the active RF circuitry may be a baseband, BB, circuitry, a transceiver, TRX, circuitry and/or a front-end, FE, circuitry and the passive RF circuitry may be an antenna array.

According to example embodiments, the RF communication device may comprise a plurality of second external RF circuitries for further processing RF signals which are configured to interface with a plurality of third external RF circuitries for transmission and/or reception of RF signals, and, a plurality of printed circuit boards mounted to the second face of the structure comprising a plurality of second feeding arrangements configured to exchange the RF signals with the structure.

The first external RF circuitry may comprise an active RF circuitry for processing RF signals, the second external RF circuitries may comprise an active RF circuitry for further processing the RF signals, and the third external RF circuitries may comprise a passive RF circuitry for transmission and/or reception of RF signals. For example, the first active RF circuitry may be a baseband, BB, circuitry and/or a transceiver, TX, circuitry, the second active RF circuitry may be a front-end, FE, circuitry, and the third passive RF circuitry may be an antenna array.

By using the structure according to the first aspect of the present disclosure, a cost-efficient, multi-functional, high-bandwidth and low-loss RF signal distribution across the RF communication device is enabled. The need for additional mechanical support for the RF circuitries is avoided as the structure allows placing of the latter directly onto the structure. Furthermore, the need for an external heat sink is also avoided, as the structure may be designed to function as a heat sink. As a result, a high-performance, cost-efficient RF communication device is provided.

The other example embodiments of the first example aspect may further be applied as example embodiments to the second example aspect.

According to a third example aspect a structure is disclosed comprising a first face with a plurality of first apertures configured to interface with at least one first external RF circuitry for processing RF signals and a second face with a plurality of second apertures configured to transmit and/or receive RF signals, the plurality of first apertures are connected to the second apertures via through-holes embedded in the structure and having an electrically conducting inner wall and configured to form a waveguide medium for carrying radio frequency, RF, signals between the plurality of first apertures and the plurality of second apertures, wherein the first face is dimensioned to accommodate the at least one first external RF circuitry, the at least one first external RF circuitry is an integrated circuit, and wherein the first apertures are spaced apart according to interconnect requirements of integrated circuits, and, the second apertures are spaced apart according to radiating requirements related to the frequency of the RF signals.

The structure thus provides an integrated waveguide medium for carrying radio frequency, RF, signals between the plurality of first apertures and the plurality of second apertures. The integrated waveguide medium enables wide bandwidth and a low-loss distribution of radio frequency, RF, signals across the through-holes and, therefore, the structure. The interconnection design between the apertures may be easily modified and adapted to the requirements of the RF communication device, thereby enabling a high-design flexibility and easy integration with the external RF circuitries.

Further, by sizing the structure to accommodate the one or more external RF circuitries, the structure intrinsically provides mechanical support for the external RF circuitries. As a result, a cost-efficient structure providing structural support for the external RF circuitries is provided. Furthermore, the structure or part of it may be designed to function as a heat sink. The structure thus enables the dissipation of thermal energy from the RF circuitries, thereby preventing overheating of the RF circuities.

The other example embodiments of the first example aspect may be applied as example embodiments to the third example aspect.

BRIEF DESCRIPTION OF THE DRAWINGS

Some example embodiments will now be described with reference to the accompanying drawings.

DETAILED DESCRIPTION OF EMBODIMENT(S)

Figure 1:
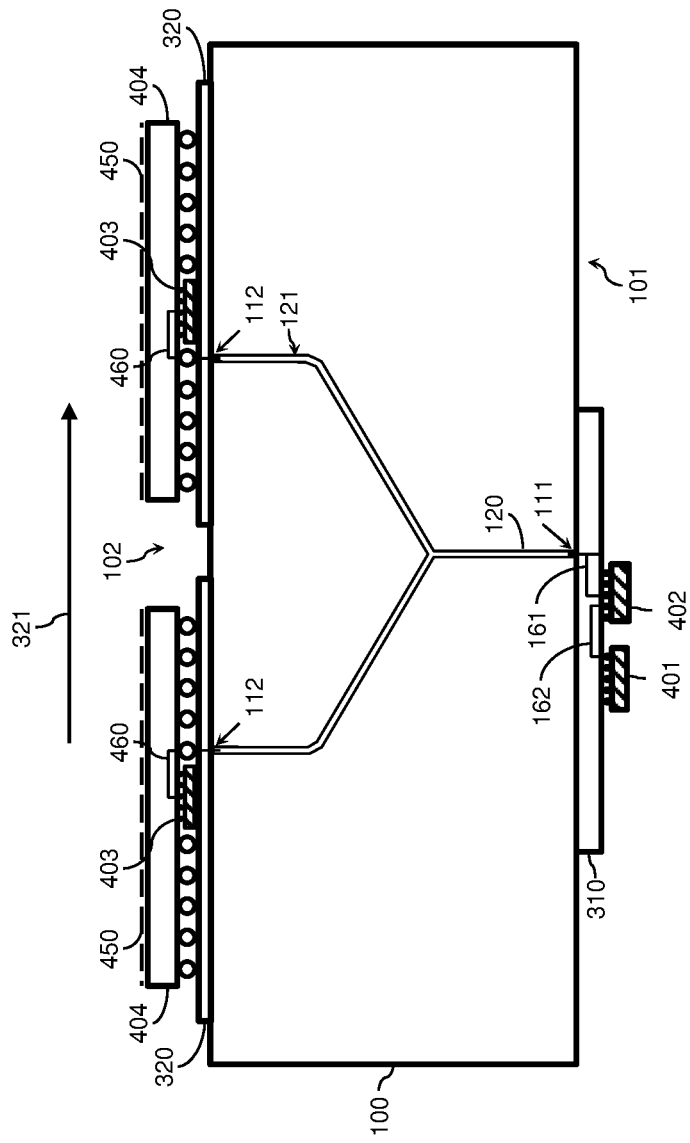
FIG. 1 shows a first exemplary embodiment of the structure according to the present disclosure.

The present disclosure discloses a structure which allows for a multi-purpose, cost-efficient, high-bandwidth and low-loss RF signal distribution for an RF communication device with a phased antenna array divided into a number of smaller antenna arrays, i.e. sector antenna arrays, and shared transceiver, TRX, and baseband, BB, functionalities are shared.

The structure comprises a first face comprising at least one first apertures and a second face comprising a plurality of second apertures. The first and second apertures are connected via through-holes embedded in the structure. The through-holes form air-filled channels that act as a waveguide medium that may carry radio frequency, RF, signals between the apertures.

The structure may comprise a triangular or a quadrilateral, such as a rectangular, square, or other types of quadrilateral cross-sections. The structure is thus a multi-facetted structure. Further, the multi-facetted structure may be a structure with an aspect ratio approaching unity. The cube is an example of a structure with aspect ratio equal to one. Furthermore, the structure may comprise at least one apex point. An apex point is a vertex point of the multi-facetted structure which is in some sense the "highest". An example of such multi-facetted structure with an apex point is a pyramid. It may be made of solid material with through-holes drilled into it, or, of separate parts glued together. The structure may be made of conductive materials, such as aluminium or copper. Alternatively, the structure may be made of non-conductive materials, such as resin, plastic, or any kind of polycarbonate. In such a case, the through-holes need to be coated with a conductive material as provided above, so that air-filled channels act as a waveguide medium. The through-holes may have a circular, a square or a rectangular cross-section. The type and dimensions of its cross-section depend on the frequency of the RF signals carried by the waveguide medium, i.e. the through-holes.

The through-holes may have a linear or a meandering structure. The through-holes may interconnect respective pairs of first and second apertures, thereby forming individual air-filled channels. Alternatively, the through-holes may interconnect one first aperture with a plurality of second apertures, thus forming air-filled channels with a branch-like structure. The air-filled channels thus function as an RF signal splitter/combiner, i.e. in one direction, it splits the RF signal into a plurality of RF signals and in the other direction, it combines the RF signals.

The structure may be sized to accommodate RF circuitries of an RF communication device, thereby providing structural and mechanical support for the RF circuitries. Further, the structure may be designed to functions as a heat sink, thereby preventing overheating of the RF circuities.

The structure will be explained in more detail below with references to FIG. 1 to FIG. 6 showing various examples of the structure.

FIG. 1 shows a first example of a structure 100 according to the present disclosure. The structure 100 comprises a rectangular cross-section with a first face 101 comprising a first aperture 111 and a second face 102 comprising two second apertures 112. The apertures 111 and 112 are connected via through-holes 120 forming the air-filled channels. The air-filled channels act as a waveguide medium 121 which carries the RF signals between the apertures, i.e. from the first aperture towards the two second apertures and vice versa from the two second apertures towards the first aperture. In this example, the waveguide medium 121 has a branch-like structure and thus acts as a power splitter/combiner.

A radio frequency, RF, communication device may be formed by providing, on the first face 101, a first Printed Circuit Board, PCB, 310 with a baseband, BB, circuitry 401 and a transceiver, TRX, circuitry 402 mounted on, and, on the second face 102, two PCBs 320 each with a front-end, FE, circuitry 403 and an antenna array 404 mounted on. The BB and TRX functionalities of the RF communication device are thus shared among the FE circuitries 403 and antenna arrays 404.

In the transmit direction, the TRX circuitry 402 is configured to receive, via the traces 162 on the PCB, a baseband, BB, signal from a baseband, BB, processing circuitry 401. The TRX circuitry 402 processes and converts the baseband signal into RF frequency. The resulting RF signal is then routed through the PCB 310 via a Substrate Integrated Waveguide, SIW, towards the feeding arrangement 161 via which the RF signal is fed into the waveguide medium 121. The waveguide medium 121 which in this case acts as a power splitter, carries the RF signal to the FE circuitries 403 for front-end processing. The processed RF signals are then fed to the antenna arrays 404 for transmission. Vice versa, in the receive direction, the RF signals received from the antenna arrays 404 are fed, via traces 460 in the PCBs 320, to the respective FE circuitries 403 for front-end processing. The thus processed RF signals are then fed, via the feeding arrangements provided by the PCBs 320, into the waveguide medium 121 which acting as a power combiner carries the processing RF signals to the TRX circuitry 402. The TRX circuitry 402 down-converts the RF signal to BB frequency and forwards it to the BB circuitry 401 for baseband processing.

The first face and second face of the structure 100 need to be dimensioned such that they can accommodate the respective integrated circuitries. For example, the first face 101 needs to be dimension such that it can accommodate the shared integrated circuitries, i.e. the PCB 310 with a BB and TRX circuitries, while the second face 102 needs to be dimensioned such that it can accommodate the distributed integrated circuitries, i.e. the PCBs 320 with the FE circuitries 403 and antenna arrays 404. The dimensions of the antenna arrays are however bigger than the other integrated circuitries as they need to comply with the radiating requirements, while the other integrated circuitries are dimensioned to comply with the interconnect requirements of integrated circuits. For example, for RF signals in the range of 30 GHz to 300 GHz, the spacing or distance between the antenna radiating elements needs to be half the wavelength of the RF signals. That is, for RF signals of 30 GHz, the spacing between the antenna radiating elements should be smaller or equal to 5 mm while for RF signals of 300 GHz, the spacing should be smaller or equal to 0.5 mm. For the antenna arrays to comply with the radiating requirements, the antenna arrays also need to respect the same distance-frequency relation so that the antenna arrays act as a unified antenna array and minimize performance degradation. That is, for RF signals of 30 GHz, the spacing between the radiating elements at the edges of the antenna arrays need to be smaller or equal to 5 mm and for RF signals of 300 GHz, the spacing should be smaller or equal to 0.5 mm. As a result, the spacing or the distance between the second apertures 112 needs to comply with the radiating requirements as well. In this example, the spacing Sf between them corresponds to the spacing between the radiating elements, Sr, multiplied by their number, Nr, along the axis 321 on which the PCBs 320 are placed, i.e.:

$$Sf = Nr \cdot Sr \qquad (1)$$

From the above, it follows that a two-dimensional antenna array with 64 radiating elements operating at 30 GHz frequency would have a size of approximately 4 cm×4 cm, while the other integrated circuitries would typically have a size of 0.5 cm×0.5 cm. It further follows that the spacing Sf between the feeding arrangements is approximately 4 cm. Furthermore, accommodating two, four or eight such antenna arrays would, for example, require the second face 102 to be with a size of at least 8 cm×4 cm, 8 cm×8 cm or 16 cm×8 cm, respectively. The sizing of the second face depends on the number of antenna arrays as well as their arrangement on the second face. For the provided example, the antenna arrays are arranged in a one-dimensional configuration of 2×1 and a two-dimensional configuration of 2×2 and 4×2, respectively.

Similarly, the sizing of the apertures 111 and 112 and therefore the dimensions of the through-holes' cross-section depends on the frequency of the RF signal. For RF signals in the range of 30 GHz to 300 GHz, the sizing of the apertures 111 and 112 and the diameter of the cross-section of the through-holes 120 would range approximately from 3.0 mm to 0.5 mm, respectively. For example, for RF signals of 30 GHz and a through-hole with a rectangular cross-section, the width and length of the rectangular cross-section may be 1.55 mm and 2.2 mm, respectively.

In this example, the second set of FE circuitries 403 are operated in a 1-to-N mode. More specifically, the TX circuitry 402 acts as a central RF circuitry or a master node. The TX circuitry 402 may directly output an RF signal at the transmit frequency range. In other words, the RF signal is the BB signal modulated to the transmit frequency range, e.g., at 60 GHz frequency. The RF signal is fed to the FE circuitries 403 via the waveguide medium 121 provided in the structure 100 as detailed above. The waveguide medium splits the modulated RF signal into plurality of RF signals which are received by the respective FE circuitries 403. The FE circuitries then phase-shift and amplify the RF signal thus outputting respective phase-shifted and amplified RF signals. These phase-shifted and amplified RF signals are then respectively fed to the corresponding antenna arrays 404 to transmit these phase-shifted and amplified RF signals.

Alternatively, the signal outputted by the TX circuitry may be the BB signal modulated to an intermediate frequency range, e.g., at 20 GHz frequency. Transmitting the intermediate signal through a waveguide medium such as the waveguide medium 121 however requires that the waveguide medium has large dimensions. The intermediate RF signal is thus preferably routed to the respective FE circuitries via cables. However, the carrier signal required by the FE circuitries 403 to modulate the intermediate RF signal to the transmission frequency range, e.g., to 60 GHz, can be transmitted via the waveguide medium 121 as detailed above. The FE circuitries 403 then first upconvert the intermediate RF signals using the carrier signal, and then phase-shift and amplify the resulting RF signals. The phase-shifted and amplified RF signals are then fed to the corresponding antenna arrays 404 to transmit these phase-shifter and amplified RF signals.

Distributing modulated carrier signal, i.e., the 60 GHz RF signal modulated with the BB signal, through the structure 100 avoids the used of high frequency cables that can be costly and less reliable. Further, it avoids the distribution of intermediate signals that leads to degradation in phase noise because of the additional division and multiplication that comes with it.

Figure 2:
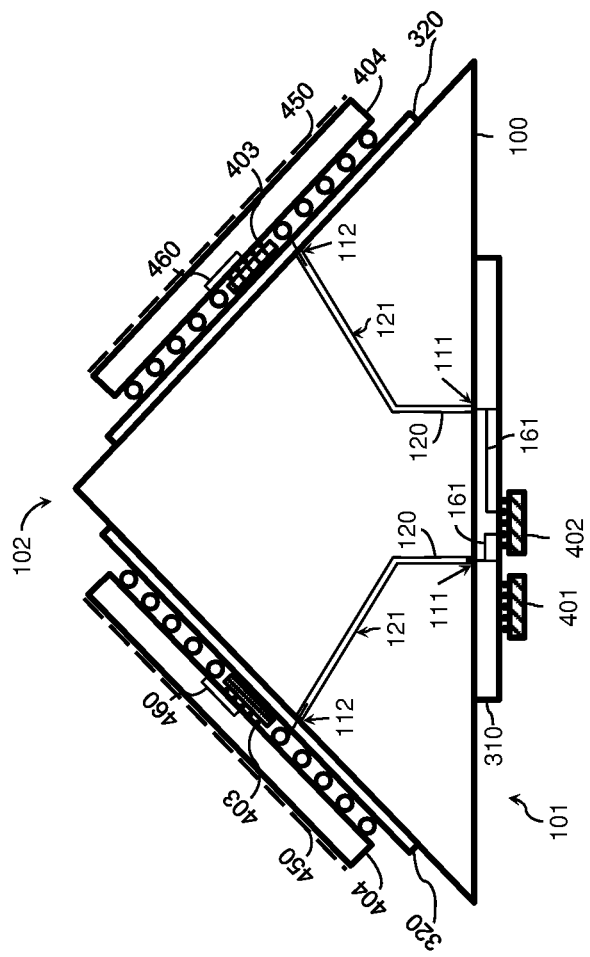
FIG. 2 shows a second exemplary embodiment of the structure according to the present disclosure.

FIG. 2 shows a second example of the structure 100 comprising a triangular cross-section with a first face 101 comprising one wall of the triangular cross-section and a second face 102 comprising the other two walls of the triangular cross-section and each of the faces provided with two apertures. The structure may further comprise an apex point at the vertex point where the other two walls of the triangular cross-section meet. The first apertures 111 and the second aperture 112 are respectively connected via through-holes 120 embedded in the structure thereby forming two air-filled channels each interconnecting a respective pair of first and second apertures. The thus formed waveguide mediums 121 do not have a branch-like structure and hence a loss of power in the RF signal due to the power split is avoided.

Again, a radio frequency, RF, communication device may be formed by providing on the first face 101 of the structure, a PCB 310 with a BB circuitry 401 and a TRX circuitry 402, and, on the second face 102, two PCBs 320 each with a FE circuitry 403 and an antenna array 404. In the transmit direction, the TRX circuitry 402 processes and converts the BB signal from the BB circuitry 401 into RF frequency. The TRX circuitry 402 splits the resulting RF signal into two RF signals. The RF signals are routed through the PCB 310 via Substrate Integrated Waveguides, SIWs, towards the feeding arrangements 161 of the PCB which feed the RF signals into the respective waveguide mediums 121. The waveguide mediums thus carry the RF signals to the respective FE circuitries 403 for front-end processing. The resulting RF signals are then fed, via traces 460 in the PCBs 320, to the antenna arrays 404 for transmission.

In the receive direction, the same operations are performed but in reverse order. That is, the RF signals received from the two antenna arrays 404 are fed to the two FE circuitries 403 via the traces 460 and then to TRX circuitry 402 via the respective waveguide mediums 121. The TRX circuitry 402 combines the received RF signals together, down-converts the resulting signals to BB frequency and finally forwards it to the BB circuitry 401 for baseband processing.

The SIWs 161 are spaced apart according to the interconnect requirements which is defined by the electrical characteristics of the PCB and the frequency of operation. This spacing defines one of the constraints for the spacing of the first apertures 111 along the first face 101 of the structure. Another, a stricter constraint for the spacing between the first aperture is the mechanical properties of the structure: the first apertures could be spaced apart as closely as the mechanical properties of the structure allow. For example, a fully metallic structure would allow for a denser distribution along the first face of the structure in comparison to a softer material, such as a plastic or a resin.

Similarly to the example of FIG. 1, the first face may be much smaller than the second face as the dimensions of the antenna arrays are bigger than the dimensions of the shared integrated circuitries and the spacing between the second apertures and the antenna arrays need to comply with the radiating requirements related to the frequency of the RF signals. As described in the example of FIG. 1, a two-dimensional antenna array with 64 radiating elements operating at 30 GHz frequency would have a size of approximately 4 cm×4 cm, while the other integrated circuitries would typically have a size of 0.5 cm×0.5 cm. Further, accommodating two, four or eight such antenna arrays would, for example, require a second face 102 with a size of at least 8 cm×4 cm, 8 cm×8 cm or 16 cm×8 cm, respectively. As the second face comprises two walls of the triangular cross-section, it follows that each of the walls should be sized to accommodate one, two or four antenna arrays. Herein, the spacing between the second apertures 112 still somewhat complies with the radiating requirements.

The second set of FE circuitries 403, herein, can be operated in the 1-to-N mode as described above with reference to FIG. 1.

Figure 3:
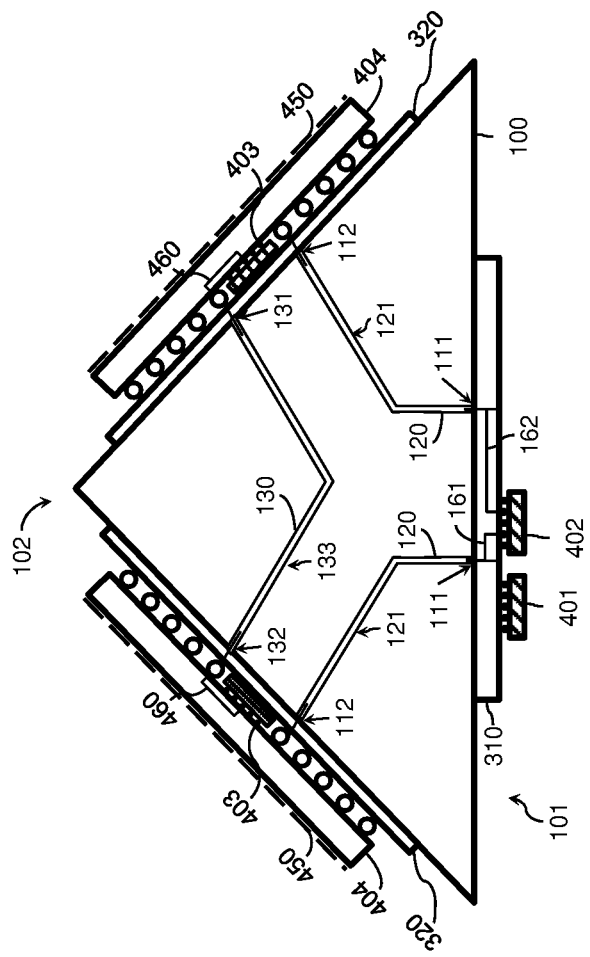
FIG. 3 shows a third exemplary embodiment of the structure according to the present disclosure.

FIG. 3 shows a third example of the structure 100 similar to the one of FIG. 2. Herein, the structure is further provided with an additional waveguide medium for RF signal distribution between the RF circuitries. The additional waveguide medium may be formed by for example interconnecting additional second apertures via through-holes. In the figure, an additional waveguide medium 133 is provided by two additional second apertures 131 and 132 interconnected via a through-hole 130. For the radio device configuration shown in FIG. 3, the additional waveguide medium 133 serves for low-loss signal distribution and/or signal synchronization between the respective FE circuities 403.

Similarly to the example of FIG. 2, the second face needs to have a size of approximately at least 8 cm×4 cm, 8 cm×8 cm or 16 cm×8 cm if to accommodate two, four or eight two-dimensional antenna arrays with 64 radiating elements operating at 30 GHz frequency with the respective walls of the triangular cross-section sized to accommodate one, two or four antenna arrays. Again, the spacing between the second apertures 112 and the antenna arrays is the same as for the example of FIG. 2. Similarly, the spacing between apertures 131 and 132 still somewhat needs to comply with the radiating requirements.

In this example, the second set of FE circuitries 403 may be operated in a daisy-chain mode. More specifically, the TX circuitry 402 may output an RF signal at the transmit frequency range. In other words, the RF signal is a signal at e.g., 60 GHz modulated with the BB signal. The RF signal is fed to the one of the FE circuitries 403 via the waveguide medium 121 provided in the structure 100, e.g., the FE circuitry located on the left side of the second phase 102. This FE circuitry phase-shifts and amplifies the RF signal to output a phase-shifted and amplified RF signal. At the same time, this FE circuitry forwards the original RF signals to the next FE circuitry 403, i.e., the FE circuitry on the right side of the second phase 102, which in turn also phase-shifts and amplifies the RF signal to output another phase-shifted and amplified RF signal. These phase-shifted and amplified RF signals are then respectively fed to the corresponding antenna arrays 404 to transmit these phase-shifted and amplified RF signals.

Alternatively, the modulated signal outputted by the TX circuitry is at an intermediate frequency, e.g., at 20 GHz. In this case, similar to the example of FIG. 1, it is preferred that the intermediate signal is fed to the first FE circuitry via a cable instead of a waveguide medium due to its large dimensions. The first FE circuitry also feds this intermediate signal to the next FE circuitry via another cable. The carrier signal from the TX circuitry is, however, fed to the first FE circuitry via the waveguide medium 121 which in turn feds this carrier signal to the next FE circuitry via another waveguide medium, i.e., the waveguide medium 133. The respective FE circuitries first upconvert the intermediate signal using the carrier signal to the transmit frequency range, e.g., 60 GHz, and then phase-shift and amplify the resulting RF signal. The phase-shifted and amplified RF signals are then fed by the FE circuitries 403 to the corresponding antenna arrays 404 which in turn transmit these phase-shifted and amplified RF signals.

The delay caused by the fact that the different FE circuitries receive the RF signal at slightly different time, is compensated by the FE circuitries by applying a different phase-shifts to the RF signal. This way it is assured that the RF signals transmitted by the respective antenna arrays constructively combine.

Compared to a 1-to-N approach where the modulated BB signals and possibly the unmodulated carrier signal are distributed, the daisy chain approach does not require a central active RF circuit such as the TX circuitry in the example of FIG. 1. Thus, the daisy chain approach offers less cost in terms of number of components and less board area, at the cost of variable delays inside caused by the FE circuitries. This however has a minimal overhead as these delays can be compensated by adjusting the phase-shift applied to the RF signal by the respective FE circuitries.

Furthermore, in the implementation where modulated carrier signal is distributed through the structure, i.e., when the TX circuitry feeds the 60 GHz RF signal modulated with the BB signal, the daisy chain approach ensures better RF bandwidth than that 1-to-N approach. The downside is that assuring a good signal to noise ratio is more challenging due to the modulation carrier signal distribution especially for large number of daisy-chained circuits.

Similarly to the example of FIG. 1, distributing modulated carrier signal, i.e., the 60 GHz RF signal modulated with the BB signal, through the structure 100 avoids the use of high frequency cables that can be costly and less reliable, as well as, it avoids the distribution of intermediate signals that leads to degradation in phase noise because of the additional division and multiplication that comes with it.

Figure 4:
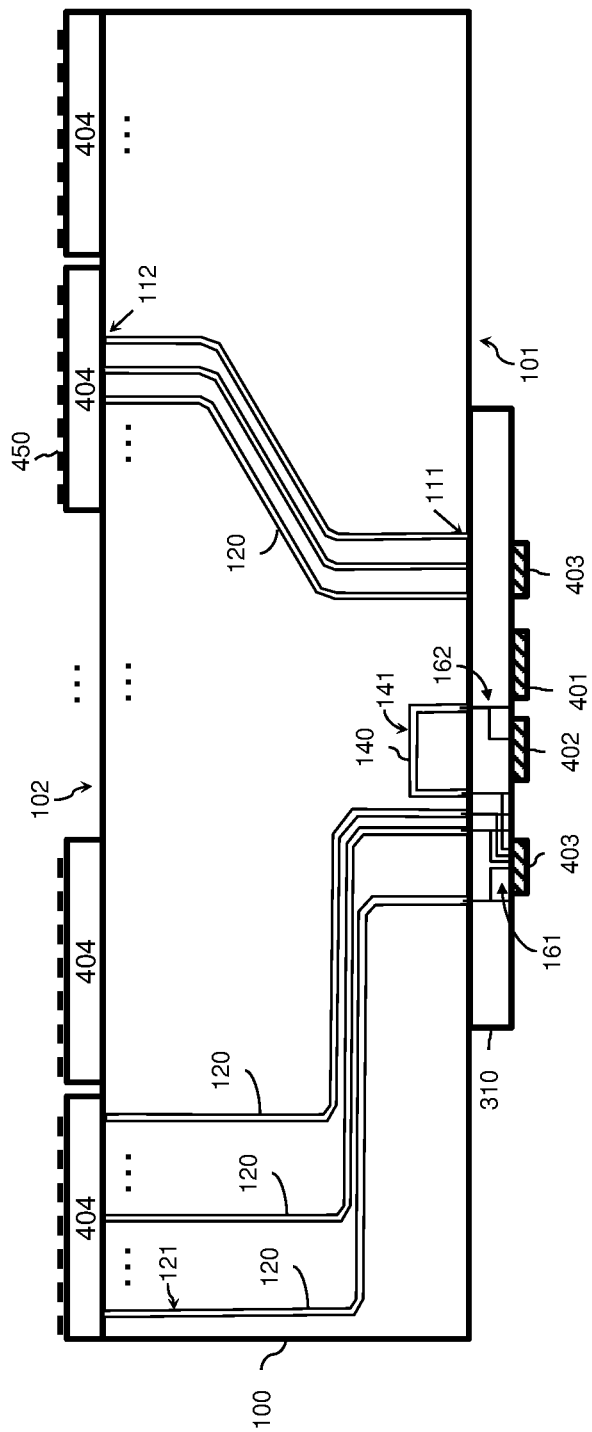
FIG. 4 shows a fourth exemplary embodiment of the structure according to the present disclosure.

FIG. 4 shows a fourth example of the structure 100 similar to the structure of FIG. 2. Herein, however, the structure 100 comprises a rectangular cross-structure with a first face 101 and a second face 102 each provided with a plurality of apertures. The first apertures 111 and the second apertures 112 are respectively connected via through-holes 120 embedded in the structure thereby forming a plurality of air-filled channels each connecting a respective pair of first and second apertures. Again, the first face may be much smaller than the second face as the dimensions of the antenna arrays are bigger than the dimensions of the shared integrated circuitries and the spacing between the second apertures and the antenna arrays need to comply with the radiating requirements related to the frequency of the RF signals.

An RF communication device may be formed by providing, on the first face 101, a first PCB 310 with a BB circuitry 401, a TRX circuitry 402 and two FE circuitries 403, and, on the second face 102, a plurality of second PCBs each comprising an antenna array 404. The RF communication device operates in the same manner as the one shown in FIG. 2 with the difference that, herein, the RF signal from the TRX circuitry 402 towards the two FE circuitries 403 and the RF signals from the FE circuitries towards the plurality of the antenna arrays 404 are distributed via waveguide mediums 140 and 120 embedded in the structure. More in particular, the RF signal from the TRX circuitry 402 is split into two and fed to the respective FE circuitries 403 via the waveguide mediums 141 (note that only one of the waveguide mediums is shown in the figure). Further, the RF signals from the respective FE circuitries 403 are split and distributed towards the waveguide mediums 121. More specifically, the RF signal from the first FE circuitry is split into a plurality of RF signals corresponding to the number of the antenna radiating elements for a subset the antenna arrays and the RF signal from the second FE circuitry is split into a plurality of RF signals corresponding to the number of the antenna radiating elements for the remaining antenna arrays. In other words, the number of the waveguide mediums 121 corresponds to the total number of the radiating elements provided by the antenna arrays.

The RF signal split and distribution towards the waveguide mediums 141 and 121 are performed by SIWs 161 and 162 integrated into the PCB 310. The SIWs are spaced apart according to the interconnect requirements which is defined by the electrical characteristics of the PCB and the frequency of operation. As the SIWs 161 and 162 are only used for the RF signal distribution within the PCB, i.e. across very short distances, the overall losses of the RF signal distribution across the RF communication device, i.e. from the TRX circuitry towards the FE circuitries and from FE circuitries towards the antenna arrays, respectively, are negligible.

The spacing between the SIWs defines the spacing between the first apertures which is further constrained by the mechanical properties of the structure. The first apertures could be spaced apart as closely as the mechanical properties of the structure allow. For example, a fully metallic structure would allow for a denser distribution along the first face of the structure in comparison to a softer material, such as a plastic or a resin.

Similarly to the example of FIG. 1, the second face needs to have a size of at least 8 cm×4 cm, 8 cm×8 cm or 16 cm×8 cm if to accommodate two, four or eight two-dimensional antenna arrays with 64 radiating elements operating at 30 GHz frequency. Herein, however, as the respective waveguide mediums 121 feed an RF signal to a respective radiating element, the spacing between the second apertures 112 need to corresponds to the spacing between the radiating elements. That is, the second apertures are spaced half the wavelength of the RF signal distributed by the waveguide mediums.

Different configurations of waveguide mediums 121 are possible in which waveguide mediums with a branch-like structure with a split ratio 1:R may be used. For example, two waveguide mediums 121 each with a split ratio of 1:64 may be used to distribute the RF signal from the respective RF circuitries towards two two-dimensional antenna arrays with 64 radiating elements. Alternatively, four waveguide mediums each with a split ratio of 1:32 may be used to distribute the RF signals from the respective FE circuitries towards the two two-dimensional antenna arrays. Further combinations of branched and unbranched waveguide mediums are also possible. The selected configuration of the waveguide mediums depends on system level specification of the RF communication device.

Figure 5:
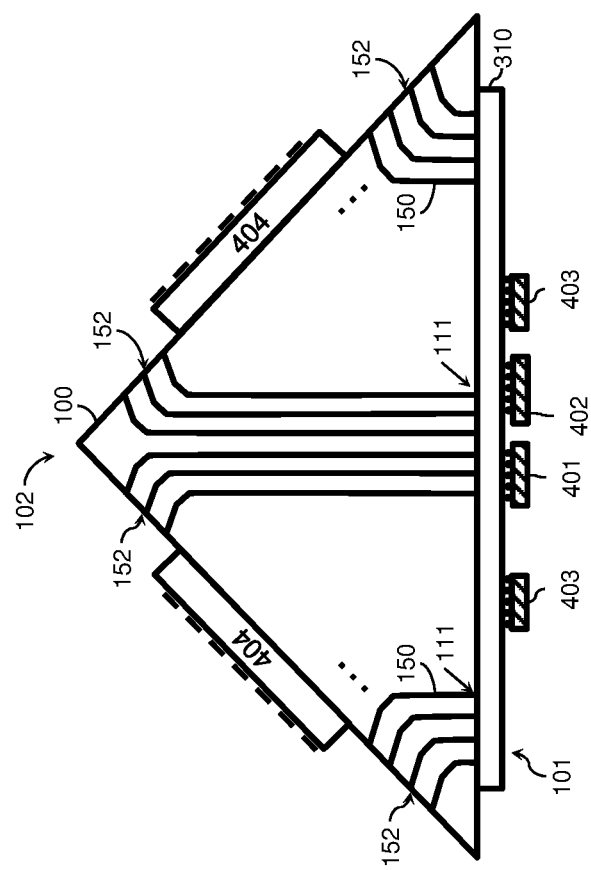
FIG. 5 shows a fifth exemplary embodiment of the structure according to the present disclosure.

FIG. 5 shows a fifth example of the structure 100 similar to the one of FIG. 4. Differently from the structure of FIG. 4, herein, the structure 100 comprises a triangular cross-section and a plurality of additional second apertures 152 connected via respective through-holes 150 to a plurality of first apertures. In this example, fourteen additional second apertures are connected to fourteen additional first apertures. The additional second apertures 152 may be designed to have different geometries which allow to easily integrate different types of antenna radiating elements into the structure. For example, a horn antenna radiating element may be provided by shaping the second aperture 152 as a funnel.

In this example, the RF signal from the respective FE circuitries 403 is thus split into a plurality of RF signals corresponding to the number of the antenna radiating elements of the two antenna arrays 404 and the additional antenna radiating elements 152. Similarly to the example of FIG. 4, SIWs integrated into the PCB 310 (not shown in the figure) are used to split and distribute the RF signals from the FE circuitries towards the air-filled channels, i.e. both towards the air-filled channels 150 and the air-filled channels 120 (not shown in the figure). As the length of the SIWs required for splitting and distributing the RF signals towards the feeding arrangement of the first apertures are rather short, the overall losses of the RF signal distribution across the RF communication device, i.e. from the FE circuitries to the antenna arrays, are negligible. Similarly to the example of FIG. 4, the spacing requirements between the SIWs, the first aperture, the second apertures and the antenna arrays apply herein as well.

Figure 6:
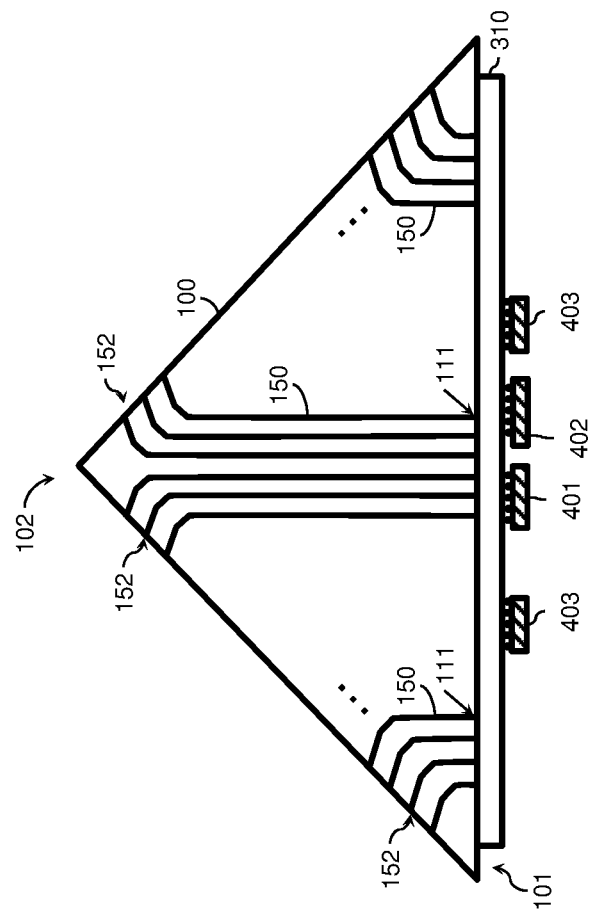
FIG. 6 shows a sixth exemplary embodiment of the structure according to the present disclosure.

FIG. 6 shows a sixth example of the structure similar to the one of FIG. 5. The spacing requirements between the SIWs, first apertures, the second apertures and the antenna arrays of FIG. 4 and FIG. 5 apply as well. Herein, the structure comprises a plurality of first and second apertures 111 and 152 respectively connected via through-holes 150 embedded in the structure thereby forming a plurality of air-filled channels each connecting a respective pair of first and second apertures. The second apertures 152 are designed to have different geometries, e.g. circular, rectangular, or square geometry, which allow to easily integrate different types of antenna radiating elements into the structure. For example, a horn antenna radiating element may be provided by shaping the second aperture 152 as a funnel. The size and the form factor of the integrated radiating elements depend on the application of the RF communication device and the constraints of the structure.

The structure of the present disclosure allows for a variety of waveguide mediums configurations comprising one or more branched and/or unbranched waveguide mediums. Thus, a structure's design complying with the requirements of the RF communication device is enabled which allows for easy integration with the external RF circuitries.

In the examples of FIG. 4 to FIG. 6, the FE circuitries 403 feeds the phase-shifted and amplified modulated RF signal to the respective antenna arrays 404 and/or antenna radiating elements 152 via individual waveguide mediums 120 provided in the structure. Distributing the modulated carrier signal through the structure 100 avoids using of the costly and less reliable high frequency cables as well as distribution of intermediate signals.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A structure comprising a first face with at least one first aperture and a second face with a plurality of second apertures, the at least one first aperture is connected to the second apertures via through-holes embedded in the structure and having an electrically conducting inner wall and configured to form a waveguide medium for carrying radio frequency, RF, signals between the at least one first aperture and the plurality of second apertures, wherein the at least one first aperture is configured to interface with at least one first external RF circuitry for processing RF signals and the plurality of the second apertures are arranged to interface with a plurality of second external RF circuitries for transmission and/or reception of RF signals, and wherein the second face is arranged to accommodate the plurality of second external RF circuitries and is dimensioned according to radiating requirements related to the frequency of the RF signals.

2. The structure according to claim 1, wherein the first face comprises a plurality of first apertures connected to the second apertures via the through-holes.

3. The structure according to claim 1, wherein the through-holes comprise a branch-like structure.

4. The structure according to claim 1, wherein at least one through-hole of the through-holes is arranged to connect at least one second aperture from the plurality of the second apertures to at least another second aperture from the plurality of the second apertures so as to carry RF signals between the plurality of second RF circuitries.

5. The structure according to claim 1 is a multi-facetted structure with an aspect ratio close to unity.

6. The structure according to claim 1 comprises a quadrilateral cross-section, wherein the first face comprises one side of the rectangular cross-section and the second face comprises at least one other side of the rectangular cross-section.

7. The structure according to claim 1 comprises a triangular cross-section, wherein the first face comprises one side of the triangular cross-section and the second face comprises the other sides of the triangular cross-section.

8. The structure according to claim 1, wherein the first face is arranged to accommodate at least one first printed circuit board, PCB, configured to interface with the at least one first external RF circuitry and comprising feeding arrangements configured to exchange RF signals with the first apertures.

9. The structure according to claim 8, wherein the first apertures are arranged to receive the respective feeding arrangements thereby enabling the waveguide medium to interface with the at least one first external RF circuitry.

10. The structure according to claim 1, wherein the second face is arranged to accommodate at least one second printed circuit board, PCB, configured to interface with the respective second external RF circuitries and comprising feeding arrangements configured to exchange RF signals with the respective second apertures.

11. The structure according to claim 1, wherein the second apertures are arranged to receive the respective feeding arrangements thereby enabling the waveguide medium to interface with the plurality of second external RF circuitries.

12. The structure according to claim 1, wherein the second face further comprises additional second apertures connected to at least one first aperture of the plurality of first apertures, and,
wherein the respective additional second apertures comprise an antenna radiating element.

13. A radio frequency, RF, communication device comprising a structure according to claim 1, the device comprising at least one first external RF circuitry for processing RF signals, and a printed circuit board mounted to the first face of the structure comprising at least one first feeding arrangement configured to exchange the RF signals with the structure.

14. The radio frequency communication device according to claim 13 further comprising a plurality of second external RF circuitries for transmission and/or reception of RF signals, and a plurality of printed circuit boards mounted to the second face of the structure comprising a plurality of second feeding arrangements configured to exchange the RF signals with the structure.

15. The radio frequency communication device according to claim 13, wherein the at least one first external RF circuitry comprises an active RF circuitry for processing RF signals, and,
wherein the second external RF circuitries comprise a passive RF circuitry for wireless transmission and reception of RF signals.

16. The radio frequency communication device according to claim 13, further comprising a plurality of second external RF circuitries for further processing RF signals and configured to interface with a plurality of third external RF circuitries for transmission and/or reception of RF signals, and a plurality of printed circuit boards mounted to the second face of the structure comprising a plurality of second feeding arrangements configured to exchange the RF signals with the structure.

17. The radio frequency communication device according to claim 16, wherein the at least one first external RF circuitry comprises an active RF circuitry for processing RF signals, the second external RF circuitries comprise an active RF circuitry for further processing the RF signals, and the third external RF circuitries comprise a passive RF circuitry for transmission and/or reception of RF signals.

18. A structure comprising a first face with a plurality of first apertures configured to interface with at least one first external RF circuitry for processing RF signals and a second face with a plurality of second apertures configured to transmit and/or receive RF signals, the plurality of first apertures are connected to the second apertures via through-holes embedded in the structure and having an electrically conducting inner wall and configured to form a waveguide medium for carrying radio frequency, RF, signals between the plurality of first apertures and the plurality of second apertures,
wherein the first face is dimensioned to accommodate the at least one first external RF circuitry, the at least one first external RF circuitry is an integrated circuit, and wherein the first apertures are spaced apart according to interconnect requirements of integrated circuits, and the second apertures are spaced apart according to radiating requirements related to the frequency of the RF signals.

* * * * *